United States Patent [19]

El-Chahawi et al.

[11] 4,234,545
[45] Nov. 18, 1980

[54] PROCESS FOR THE RECOVERY OF COBALT VALUES

[75] Inventors: Moustafa El-Chahawi, Troisdorf; Uwe Prange, Niederkassel-Ranzel, both of Fed. Rep. of Germany

[73] Assignee: Dynamit Nobel Aktiengesellschaft, Troisdorf, Fed. Rep. of Germany

[21] Appl. No.: 947,904

[22] Filed: Oct. 2, 1978

[30] Foreign Application Priority Data

Oct. 8, 1977 [DE] Fed. Rep. of Germany ....... 2745377

[51] Int. Cl.³ .................... C01G 51/02; C01G 51/04
[52] U.S. Cl. .................................. 423/138; 252/416; 423/417; 423/594
[58] Field of Search ............. 423/138, 417, 418, 592, 423/594; 260/604 HF

[56] References Cited

U.S. PATENT DOCUMENTS

| | | | |
|---|---|---|---|
| 1,937,689 | 12/1933 | Frazer | 423/592 |
| 2,529,236 | 11/1950 | Hart et al. | 252/416 |
| 3,036,909 | 5/1962 | Simon | 252/416 X |
| 3,131,142 | 4/1964 | Mills | 423/138 |
| 3,341,470 | 9/1967 | Hensley | 252/413 |
| 3,414,371 | 12/1968 | Rogers | 423/594 |
| 3,463,741 | 8/1969 | Russell | 252/416 |
| 3,773,890 | 11/1973 | Fox et al. | 423/138 |
| 4,049,788 | 9/1977 | Bierbach | 423/592 |

FOREIGN PATENT DOCUMENTS

1947703  4/1971  Fed. Rep. of Germany ........... 423/592

*Primary Examiner*—Edward J. Meros
*Attorney, Agent, or Firm*—Sprung, Felfe, Horn, Lynch & Kramer

[57] ABSTRACT

A process for the recovery of cobalt from residues and/or wastes containing the same by converting the cobalt to cobalt oxide. Disclosed herein is a process for recovering cobalt values from cobalt-containing residues by heating the cobalt in the presence of air to form cobalt oxide which can be separated readily from water-soluble salts which may be present therewith.

8 Claims, No Drawings

PROCESS FOR THE RECOVERY OF COBALT VALUES

BACKGROUND OF THE INVENTION

1. Field of the Invention

This invention relates to the recovery of cobalt containing residues and/or wastes especially residues or wastes of the chemical industry which contain cobalt or colbalt compounds often in the presence of great excesses of accompanying substances such as organic or inorganic chemicals. The process of the present invention comprise heating the cobalt containing residue in the present of air to convert the cobalt to cobalt oxide.

2. Discussion of the Prior Art

In numerous processes of the chemical industry, residues containing cobalt are produced. Since cobalt and its compounds are used especially as catalysts, these residues are so greatly contaminated with organic or inorganic substances, and frequently with both, that the valuable cobalt has hitherto not been recoverable.

Such residues are formed especially in reactions in which cobalt-containing catalysts are used, in the form of either cobalt metal or cobalt compounds which are unsupported or supported on carbon or carbon compounds. Examples are Raney cobalt and organic cobalt compounds in which the cobalt is bound in homeopolar or in complex form to carbonyl, nitrosyl, cyano or olefin groups, for example, or in some cases also to phosphine residues, and which in some cases may also contain alkali or alkaline earth ions. Such reactions are very numerous, examples being hydrogenation and dehydrogenation, oxo synthesis, the numerous variants of the Reppe synthesis, and the syntheses which are performed with the use of cobalt carbonyl compounds, to mention but a few.

Such wastes and residues produced in chemical processes have in many cases low contents of cobalt ranging from 0.01 to 10%, especially from 0.05 to 5%, by weight, often in addition to high contents or organic substances and frequently high contents of soluble salts, especially alkali metal salts such as sodium chloride or potassium chloride. Used cobalt catalysts are also encountered which have high cobalt contents, e.g. up to 90 or 95 wt.% Co, reconed as metal. Furthermore, these wastes or residues often are in moist form or dissolved or suspended in water or other liquids. The processes commonly known in metallurgy are impractical in these cases on account of the large amount of accompanying substances. The conversion of the cobalt to metallic cobalt, by reduction for example, is too expensive.

SUMMARY OF THE INVENTION

In accordance with the present invention, it has been discovered that cobalt values can be recovered from residues containing cobalt or cobalt compounds by heating the cobalt containing residue in the presence of air. Specifically, it has been found that cobalt and cobalt compounds within residues can be converted to cobalt oxide in a relatively simple manner and that the cobalt oxide can be recovered in a substantially pure form. This enables one to form cobaltous catalyst and to recover the cobalt virtually completely, even in the form of very valuable substances.

The present invention relates to a process for the recovery of cobalt from cobaltous residues and from solutions or suspensions thereof by a process which comprises heating the cobalt or cobalt compounds in said residues in the presence of organic components and/or water-soluble components at a temperature sufficient to convert the cobalt to cobalt oxide. The heating is conducted in the presence of oxygen or oxygen containing gases as e.g. air.

By the process of the invention, one can recover cobalt in a form which can be readily converted to a cobalt carbonyl compound which can be employed as a catalyst in a carbonylation process. Such processes are known expecially from German Pat. No. 2,240,398 and German Offenlegungsschrift No. 2,524,389, in which the cobalt catalyst is used in the form of dicobalt octacarbonyl ($Co_2(CO)_8$) which consists of cobalt and carbonyl groups. As the catalyst is rendered unusable, cobaltous sludges are formed which contain by-products of an organic nature and chlorides of the alkali and alkaline earth metals, especially sodium chloride, which have formed in the reaction, and, in some cases, residues of the alkaline substances used.

In the residues cobalt may be present as metal metals salts or complex or organic cobalt compound; in much cases mixed with organic substance, all of the remainder consisting wholly or largely of water-soluble salts, mostly sodium chloride.

It is especially advantageous that the cobalt recovered in accordance with the invention from the residues of the above-named carbonylation processes, and in some cases even cobalt recovered from other catalyst residues, can be transformed very simply and completely back into dicobalt octacarbonyl by reaction with carbon monoxide and hydrogen gas.

The process is always performed by substantially or completely burning the residues of organic substances and transforming the cobalt compounds including any cobalt in the residue completely or very substantially to the cobalt oxide, which is insoluble in water. Two methods can be used for this purpose.

In one method, the residues in solid form, dried or still moist with aqueous or nonaqueous liquids, are heated in a furnace at 300° to 800° C., especially 400° to 600° C., with the injection of air or other source of oxygen. A rapid and complete reaction is promoted by assuring that the cobalt residue has a large surface area. If water-soluble salts, such as alkali halides or alkaline earth halides, are present, they remain unaltered, since the combustion temperature is below their melting point. After cooling, the cobalt oxide can be used directly, or it is separated from water-soluble salts by washing out the latter with water. Suitable furnaces are shaft furnaces, muffle furnaces, rotary kilns, and the like.

In the second method, the residues are preferably dissolved or suspended in water and sprayed in a gas or oil heated combustion chamber or fed in solid form to the combustion chamber, the temperature therein amounting to 800° to 1200° C. The smoke gas emerging from the combustion chamber is cooled and preferably washed in a washing tower, whereupon any water-soluble salts that may be present, partially in the form of an aerosol, enter into the aqueous phase. In this case, too, the cobalt is in the form of cobalt oxide and can be separated from the aqueous phase by filtration. If the cobalt oxide is formed in high concentration or as pure substance, it can be settled in the form of dust from the smoke gases. Cobalt oxide settling in solid form on the bottom of the combustion chamber is recovered as is in some cases delivered to the wash tower for the removal of water-soluble compounds.

It is also possible to feed the residues in dried or still moist form to a preferably directly heated fluidized bed in which the organic components are burned off at 800° to 1200° C. and cobalt oxide is formed.

The residence time amounts in the first case to from 20 minutes to one hour, and in the second case two to five seconds are required, depending on the content of organic components and soluble salts, and depending on the reaction temperature.

The cobalt oxide formed in this process can easily be reacted again to form dicobalt octacarbonyl. In the presence of carbon monoxide and hydrogen, under the usual conditions, dicobalt octacarbonyl is formed quantitatively. All of the cobalt can in this manner be made reusable as catalyst, without loss. Organic components present in the cobalt containing residues are combusted and leave the furnace or combustion chamber as gases and thus are separated from the cobalt oxide formed which therefore is free from organic components.

In order to more fully illustrate the nature of the invention and in a manner of practicing the same, the following examples are presented.

EXAMPLES

Example 1

In a muffle furnace indirectly heated at 550° C., a residue of a carbonylation reaction catalyzed by cobalt compounds and containing water soluble salts, substantially sodium chloride, approximately 12% of organic components and about 3% of cobalt in the form of cobalt compounds, by weight, is treated for half an hour with the injection of air. After cooling, the weight is found to have decreased by about 12%. The sodium chloride, colored black by the cobalt oxide, is dissolved in water, and after filtration a clear solution remains whose cobalt content is less than 5 ppm. The filtered cobalt oxide is dried and is used for the preparation of dicobalt octacarbonyl.

Example 2

An approximately 50 weight-percent aqueous suspension of a residue from a carbonylation reaction, containing sodium chloride, approximately 12% of organic components and 1.2% of cobalt by weight, is fed by means of an air atomizing nozzle into a ceramic-lined combustion chamber heated by an oil burner at 1000° C. At the same time, air is blown into the combustion chamber to burn off the organic components. The smoke gases are first cooled and then washed, one part of fresh water being added and one part of the salt brine being circulated. A concentrated aqueous sodium chloride solution is withdrawn, in which the cobalt is suspended in the form of cobalt oxide. The cobalt oxide is filtered out and dried. It is suitable for the preparation of dicobalt octacarbonyl.

The salt solution, like the one of Example 1, has such a high purity that it can be used as the starting substance for alkali metal chloride electrolysis.

Example 3

The exhausted Raney cobalt catalyst from a hydrogenating apparatus, containing, in addition to cobalt, approximately 30% by weight of organic substance, mostly in the form of fats or their residues, is converted in accordance with Example 1 to approximately 98 wt.-% pure cobalt oxide, while the organic residues are burned off. Since the water-soluble salt content is very low, washing with water is unnecessary.

The cobalt oxide obtained can be transformed by reduction with hydrogen to a cobalt metal powder usable as catalyst, or for the preparation of dicobalt octocarbonyl.

What is claimed is:

1. A process of recovering cobalt values from a cobalt-containing residue containing from 0.01 to 10% by weight cobalt obtained from a carbonylation process catalyzed by a cobalt-containing catalyst which consists essentially of heating said cobalt-containing residue in a combustion chamber at a temperature of 800° to 1200° C. for two to five seconds in the presence of an amount of oxygen or oxygen-containing gas to convert the cobalt contained therein to cobalt oxide.

2. A process according to claim 1 wherein the cobalt-containing residue is suspended or dissolved in water, and injected through a nozzle into the combustion chamber.

3. A process according to claim 2 wherein into the chamber there is injected a heating gas or heating oil.

4. A process according to claim 1 wherein following combustion cobalt oxide is separated from water-soluble compounds with which it is in admixture.

5. A process according to claim 4 wherein the water-soluble salts are removed from admixture with cobalt oxide by contacting the mixture with water.

6. A process according to claim 4 wherein separated and dried cobalt oxide is thereafter transformed into dicobalt octacarbonyl by contacting the same with a mixture of carbon monoxide and hydrogen.

7. A process according to claim 1 wherein said cobalt-containing residue contains organic compounds.

8. A process according to claim 7 wherein said organic compounds are present in an amount of 12 to 30 weight percent.

* * * * *